(12) United States Patent
Schippmann et al.

(10) Patent No.: US 6,907,706 B1
(45) Date of Patent: Jun. 21, 2005

(54) TOWER FOR WIND POWER INSTALLATIONS

(75) Inventors: Hugo L. Schippmann, Luebeck (DE); Peter Maack, Luebeck (DE)

(73) Assignee: DeWind Technik GmbH, Luebeck (DE)

( * ) Notice: Subject to any disclaimer, the term of this patent is extended or adjusted under 35 U.S.C. 154(b) by 0 days.

(21) Appl. No.: 10/239,283

(22) PCT Filed: Mar. 23, 2000

(86) PCT No.: PCT/EP00/02558

§ 371 (c)(1),
(2), (4) Date: Sep. 20, 2002

(87) PCT Pub. No.: WO01/71184

PCT Pub. Date: Sep. 27, 2001

(51) Int. Cl.[7] .................................. E04C 3/30
(52) U.S. Cl. ............... 52/726.4; 52/40; 52/651.01; 52/726.3; 52/721.2; 52/736.1; 52/736.2; 52/737.1; 52/123.1; 52/730.4; 52/731.2; 52/731.4; 52/732.1; 52/732.3; 343/874
(58) Field of Search ............... 52/40, 651.01, 52/726.3, 726.4, 721.2, 736.1, 736.2, 737.1, 52/123.1, 730.4, 731.2, 731.4, 732.1, 732.3; 343/874

(56) References Cited

U.S. PATENT DOCUMENTS

| | | | | |
|---|---|---|---|---|
| 82,663 A | * | 9/1868 | Shaffer | ............... 52/737.1 |
| 87,016 A | * | 2/1869 | Walters | ............... 52/651.08 |
| 125,771 A | * | 4/1872 | Trego | ............... 52/651.02 |
| 811,435 A | * | 1/1906 | Perdue | ............... 52/736.2 |
| 2,016,011 A | * | 10/1935 | Kent | ............... 52/292 |
| 2,401,799 A | * | 6/1946 | Riemenschneider et al. | .. 52/148 |
| 2,410,246 A | * | 10/1946 | Scrivener et al. | ............ 52/148 |
| 2,862,252 A | * | 12/1958 | Beach, Jr. | ............... 52/27 |
| 4,272,929 A | * | 6/1981 | Hanson | ............... 52/40 |
| 4,406,094 A | * | 9/1983 | Hempel et al. | ............... 52/40 |
| 6,335,709 B1 | * | 1/2002 | Cummings | ............... 343/890 |
| 6,349,521 B1 | * | 2/2002 | McKeon et al. | ............ 52/735.1 |
| 6,399,881 B2 | * | 6/2002 | Edelstein | ............... 174/45 R |
| 6,408,575 B1 | * | 6/2002 | Yoshida et al. | ............... 52/40 |
| 6,467,233 B1 | * | 10/2002 | Maliszewski et al. | ...... 52/720.1 |
| 6,470,645 B1 | * | 10/2002 | Maliszewski et al. | .... 52/745.18 |
| 6,532,700 B1 | * | 3/2003 | Maliszewski et al. | .......... 52/40 |
| 6,614,125 B2 | * | 9/2003 | Willis et al. | ............... 290/55 |

FOREIGN PATENT DOCUMENTS

| | | |
|---|---|---|
| DE | 38 42 026 A | 7/1990 |
| EP | 0 692 629 A | 1/1996 |
| FR | 577 547 A | 9/1924 |

* cited by examiner

*Primary Examiner*—Carl D. Friedman
*Assistant Examiner*—Steve Varner
(74) *Attorney, Agent, or Firm*—Michael J. Striker

(57) ABSTRACT

A tower (1) for wind power installations, on which at least one rotor (2) that can be driven by wind can be rotatably supported, has an especially low mass relative to its load-bearing capacity, stability, and rigidity, if it has a tower portion (3), tapering toward the top, with a bulging outer wall (4) that is convex in longitudinal section.

7 Claims, 2 Drawing Sheets

TOWER FOR WIND POWER INSTALLATIONS

BACKGROUND OF THE INVENTION

The invention relates to a tower for wind power installations, on which at least one rotor that can be driven by wind can be rotatably supported.

In terms of stability and rigidity, stringent demands are made of such a tower for a wind power installation. Not only must the tower support the rotor and withstand the wind load on both the tower itself and the rotor in high winds; it must furthermore not exhibit any fatigue, even under the dynamic and periodic load of the rotating rotor over long periods of time. Moreover, if at all possible, its natural oscillation frequencies should not be harmonics of the prevailing frequency of rotation of the rotor, so as to keep the amplitudes of the natural oscillation as low as possible.

Known tower constructions comprise a steel tube, or a plurality of steel pipe segments, and the tube cross section tapers linearly from the bottom to the top. In that case, the outer wall of the tower essentially has the form of a conical jacket whose tip has been cut off. The outer walls have a rectilinear profile in longitudinal section. Because the diameter decreases linearly upward toward the tip of the tower, weight is saved compared to a cylindrical tower shape, and relatively good stability is achieved.

SUMMARY OF THE INVENTION

The object of the invention is to disclose a tower for wind power installations which with adequate stability and rigidity has the lowest possible total mass.

According to the invention, this object is attained by providing that the tower has at least one tower portion, tapering toward the top, with a bulging outer wall of convex cross section. Surprisingly, it has been found that compared to the known rectilinear conical jacket form, the bulging form according to the invention makes a weight reduction of 10 to 15% of the total tower mass possible, for the same stability and rigidity. The result is not only material cost savings but also savings in production and assembly costs.

In a feature of the invention, it is provided that the aforementioned bulging tower portion is shaped such that an angle formed between the tower axis and a normal to the outer wall becomes substantially constantly smaller with increasing height of the reference point. As a result of this provision, the smoothest possible outer wall is obtained, whose weight is especially low in proportion to its stability.

A modified embodiment of the invention provides that the tower has at least one further tower portion, tapering toward the top, with an essentially conical-jacket-shaped outer wall. In this embodiment, the tower accordingly only intermittently has the bulging form according to the invention, while at least one other tower portion is embodied as conical-jacket-shaped, in the conventional way. In this way, conventional tower portions that can be procured especially favorably can be combined with the tower portions of the invention; the conventional tower portions should then be disposed where only shaping them according to the invention would achieve only slight weight savings would anyway. The tower portions of the invention should preferably be located in regions where there is a high potential saving in weight.

An embodiment in which the tower has two tower portions that taper toward the top, and a lower tower portion with an essentially conical-jacket shaped outer wall merges at its top with its tower portion with a bulging outer wall that is convex in cross section, so that an acute angle, formed between the tower axis and a normal to the outer wall, remains substantially constant in the region of the lower tower portion, with increasing height, and becomes essentially constantly smaller in the middle tower portion, has proved especially effective in view of the object of the invention.

In a feature of the invention, it is proposed that the aforementioned acute angle is approximately 89.6° in the lower tower portion and decreases from approximately 89.6° to approximately 87.5° in the middle portion.

It is also recommended that referred to a tower height of 65 m, the tower diameter at the bottom is approximately 3.90 m, at a height of 16.4 m is approximately 3.78 m, at a height of 38 m is approximately 3.22 m, and at a height of 65 m is approximately 2.15 m. This kind of tower profile makes for weight savings of approximately 12%. It is understood that the tower profile thus defined is also advantageous for towers of other heights. In that case, the tower diameters must be increased or reduced in proportion to the tower height.

In a further feature of the invention, it is proposed that the tower essentially comprises three steel pipe segments, and for a tower height of 65 m, a first tower segment extends from the bottom to approximately 16.4 m and forms the conical-jacket-shaped tower portion, which is adjoined by the convexly bulging tower portion, which comprises a second tower segment approximately 21.6 m in length and a third tower segment approximately 27.0 m in length.

BRIEF DESCRIPTION OF THE DRAWINGS

One exemplary embodiment of the invention will be described in further detail below in conjunction with the drawings. Individually, the drawings show the following:

In FIG. 1, a wind power installation can be seen, with a tower 1 and a wind-drivable rotor 2, which is rotatably supported on the tower 1.

DESCRIPTION OF THE PREFERRED EMBODIMENTS

Figure 1:
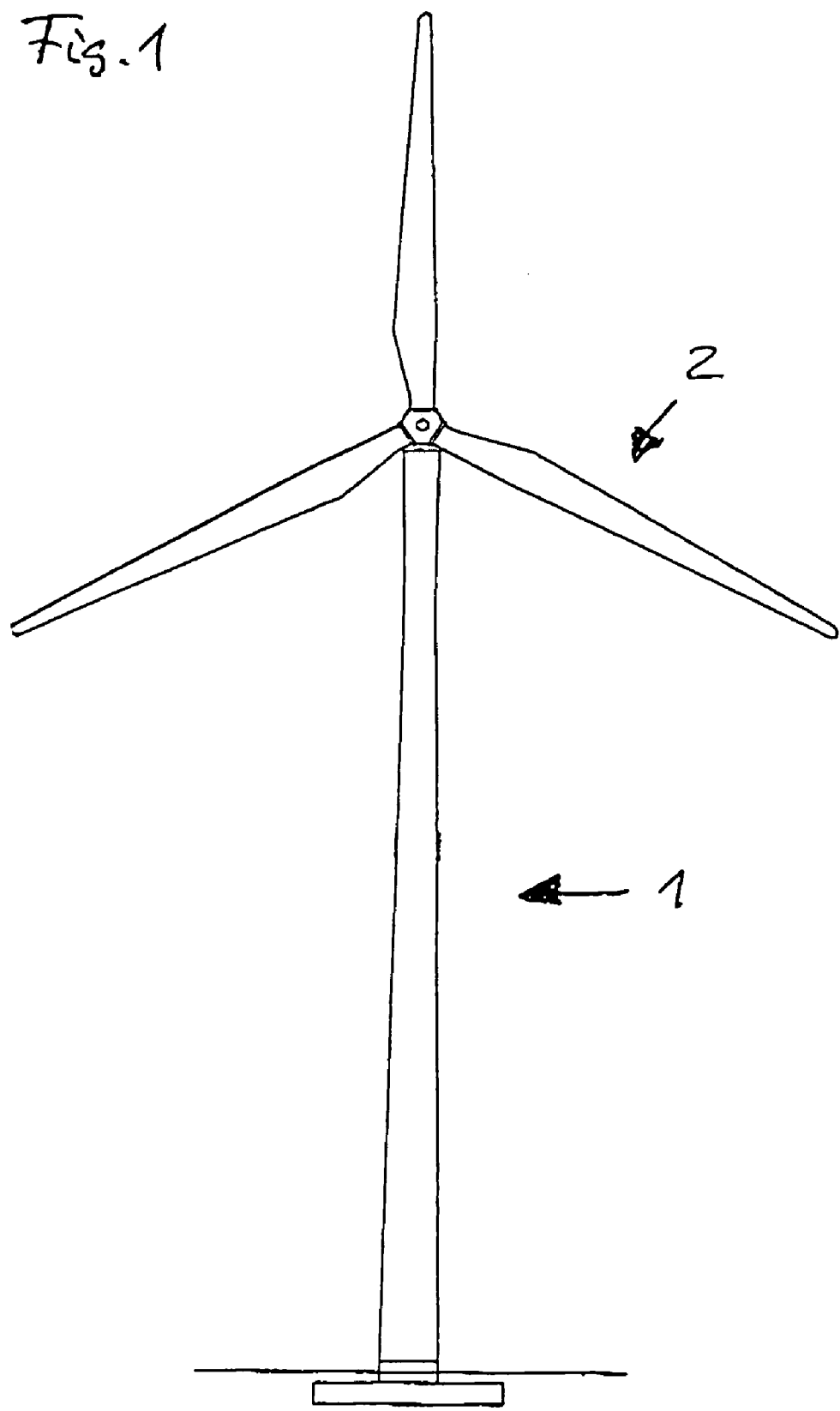
FIG. 1: a schematic view of a wind power installation with a tower and rotor.
Figure 2:
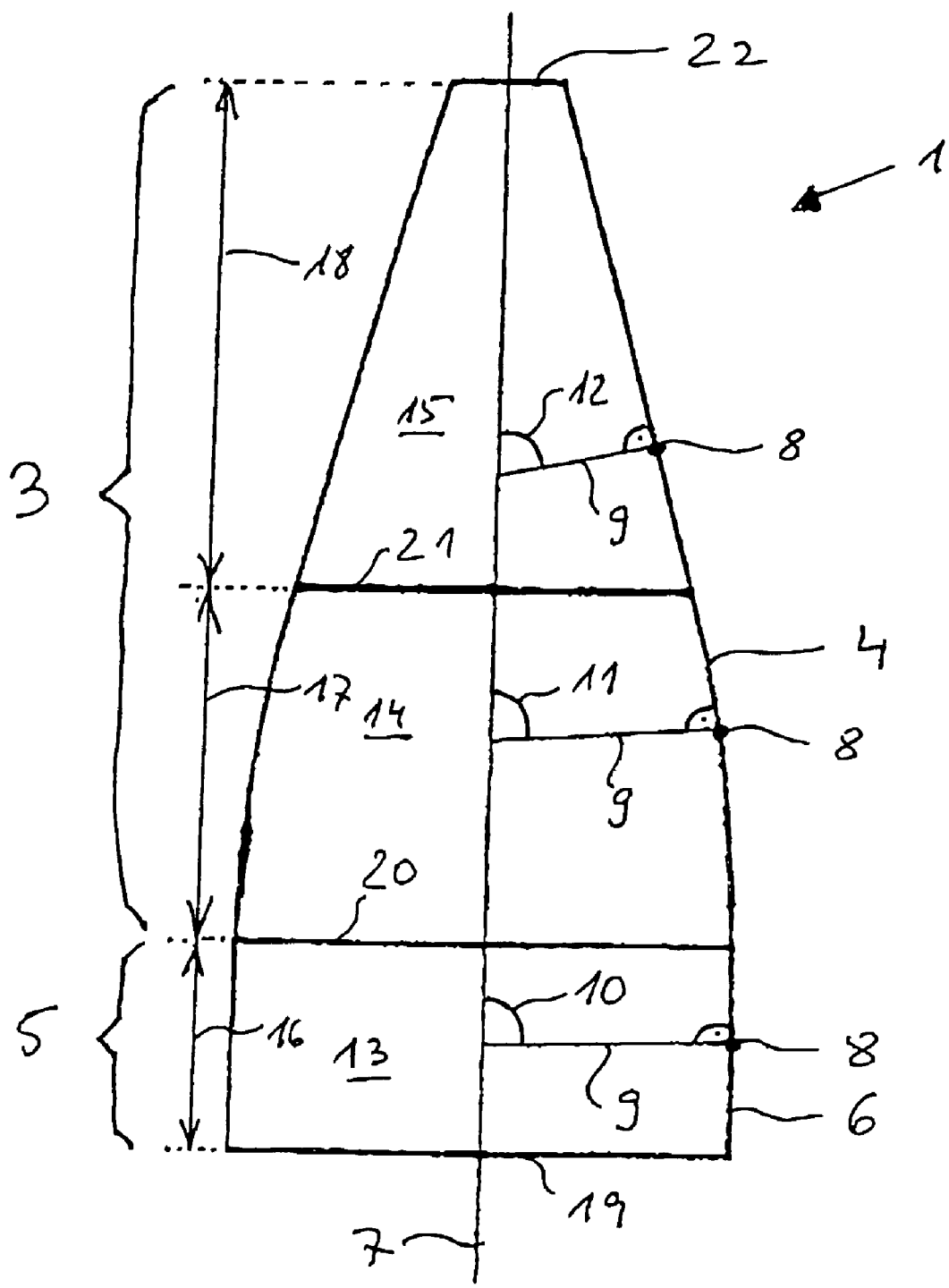
FIG. 2: a schematic view of a tower profile of the invention, with the width shown greatly exaggerated.

As best seen from the horizontally highly exaggerated view in FIG. 2, the tower 1 has an upper tower portion 3, tapering toward the top, which has a bulging outer wall 4 of convex shape, in the longitudinal section shown. A lower tower portion 5 has an outer wall 6, which is embodied as essentially conical-jacket-shaped and which likewise tapers toward the top.

An acute angle 10, formed in the region of the lower tower portion 5 between the tower axis 7 and a normal 9 to the outer wall 6 that extends through a reference point 8 on the outer wall 6, is essentially the same size as the height of the reference point 8 increases.

Conversely, in the region of the bulging tower portion 3, the acute angle 11, 12 between the tower axis 7 and the normal 9 extending through a reference point 8 on the outer wall 4 becomes constantly smaller as the height of the reference point 8 increases.

While the acute angle 10 in the lower tower portion 5, in the exemplary embodiment shown, is approximately 89.6°, the acute angles 11, 12 at the transition between the lower tower portion 5 and the upper tower portion 3 also have values of 89.6°, which toward the top, in the region of the angle 11 shown, decrease initially sharply and then less sharply, over the further course in the region of the angle 12 shown, until the acute angle reaches values of approximately 87.5°, in the vicinity of where the rotor 2 is fastened.

The tower 1 is composed of three tower segments 13, 14, 15, from which a first tower segment 13, from the bottom 19, reaches a height 16 of 16.4 m and forms the conical-jacket-shaped tower portion 5. The bulging upper tower portion 3 is formed by a second tower segment with a height 17 of 21.6 m and a third tower segment 15, rising above it, with a height 18 of 27.0 m. The tower 1 thus reaches a total height of approximately 65 m.

In the region of the bottom 19 of the first tower segment, the tower 1 has a diameter of 3.90 m; in the transition region between the first tower segment 13 and the second tower segment 14, at the level 20 of 16.4 m above the bottom 19, the tower 1 has a diameter of 3.78 m. In the next transitional region between the second tower segment 14 and the third tower segment 15, at the height 21 of approximately 38 m, the tower 1 has a diameter of 3.22 m. At the top 22 of the third tower segment 15, at a height of approximately 65 m, the tower 1 finally reaches a diameter of 2.15 m.

The weight of the bulging tower 1 according to the invention, in the exemplary embodiment described, is approximately 68 t. By comparison, a conventional tower with a constant conical angle and the same load-bearing capacity, would have a mass of markedly more than 77 t.

LIST OF REFERENCE NUMERALS

1 Tower
2 Rotor
3 Upper tower portion
4 Outer wall
5 Lower tower portion
6 Outer wall
7 Tower axis
8 Reference point
9 Normal
10 Acute angle
11 Acute angle
12 Acute angle
13 First tower segment
14 Second tower segment
15 Third tower segment
16 Height
17 Height
18 Height
19 Underside/bottom
20 Height
21 Height
22 Top/height

What is claimed is:

1. A wind power installation, comprising at least one rotor; a tower on which said at least one rotor is supported rotatably, said tower having at least one tower portion that tapers toward a top and has a bulging outer wall that is convex in longitudinal section, to provide a lowest possible total mass of the tower with adequate stability and rigidity.

2. The wind power installation of claim 1, characterized in that the aforementioned bulging tower portion (3) is shaped such that an angle (11, 12) formed between the tower axis (7) and a normal (9) to the outer wall (4) becomes substantially constantly smaller with increasing height of a reference point (8).

3. The wind power installation of claim 1, characterized in that the tower (1) has at least one further tower portion (5), tapering toward the top, with a substantially conical-jacket-shaped outer wall (6).

4. The wind power installation of claim 1, characterized in that the tower (1) has two tower portions that taper toward the top, and a lower tower portion (5) with a substantially conical-jacket-shaped outer wall (6) merges at its top (20) with its tower portion (3) with a bulging outer wall (4) that is convex in longitudinal section, so that an acute angle (10, 11, 12), formed between the tower axis (7) and a normal (9) to the outer wall (8), remains substantially constant in the region of the lower tower portion (5), with increasing height, and becomes substantially constantly smaller in the upper tower portion.

5. The wind tower installation of claim 4, characterized in that the acute angle (10, 11, 12) is approximately 89.6° in the lower tower portion (5) and decreases from approximately 89.6° to approximately 87.5° in the upper tower portion (3), so as to provide a weight saving of the tower of the wind power installation.

6. The wind power installation of claim 5, characterized in that with a tower height of 65 m, the tower diameter at the bottom (19) is approximately 3.90 m, at a level (20) of 16.4 m is approximately 3.78 m, at a height (21) of 38 m is approximately 3.22 m, and at a height (22) of 65 m is approximately 2.15 m, so as to provide a weight saving of the tower of the wind power installation.

7. The wind power installation of claim 1, characterized in that the tower substantially comprises steel pipe segments (13, 14, 15), and for a tower height of 65 m, a first tower segment (13) extends from the bottom (19) to a level (20) of approximately 16.4 m and a the conical-jacket-shaped tower portion (5), which is adjoined by the convexly bulging tower portion (3), which in turn comprises a second tower segment (14) with a height (17) of approximately of 21.6 m and a third tower segment (15) with a height (18) of approximately 27.0 m, so as to provide a weight saving of the tower of the wind power installation.

* * * * *